United States Patent [19]

Roberts

[11] 4,173,248

[45] Nov. 6, 1979

[54] MEDIUM DENSITY, HIGH STRENGTH LIGNOCELLULOSE COMPOSITION BOARD INCLUDING EXHAUSTIVELY HYDRATED CELLULOSIC GEL BINDER

[75] Inventor: James R. Roberts, Palatine, Ill.

[73] Assignee: Eucatex S.A. Industria e Comercio, Sao Paulo, Brazil

[21] Appl. No.: 884,353

[22] Filed: Mar. 7, 1978

Related U.S. Application Data

[63] Continuation-in-part of Ser. No. 597,450, Jul. 21, 1975, abandoned.

[51] Int. Cl.$^2$ ............................................. D21F 11/00
[52] U.S. Cl. .................................... 162/141; 162/176; 162/206; 162/225
[58] Field of Search ............... 162/142, 150, 148, 176, 162/187, 225, 141, 206

[56] References Cited

U.S. PATENT DOCUMENTS

| 1,790,839 | 2/1931 | Richter | 162/176 |
| 1,862,688 | 7/1932 | Loetscher | 162/225 |
| 3,367,828 | 2/1968 | Carter et al. | 162/225 |
| 3,386,879 | 6/1968 | Yan et al. | 162/225 |
| 4,043,862 | 8/1977 | Roberts | 162/176 |

FOREIGN PATENT DOCUMENTS

449167  6/1948  Canada ................................. 162/142

OTHER PUBLICATIONS

Davis, "Free, Scale Intercon.," TAPPI Data Sheet-31.

Primary Examiner—S. Leon Bashore
Assistant Examiner—Peter Chin
Attorney, Agent, or Firm—Eugene D. Farley

[57] ABSTRACT

A medium density, high strength lignocellulose composition board comprises on a dry weight basis from 60 to 95% lignocellulose particles and from 5 to 40% exhaustively hydrated cellulosic gel binder, the gel binder being characterized in its gel condition by a TAPPI drain time of at least 350 seconds.

16 Claims, No Drawings

MEDIUM DENSITY, HIGH STRENGTH LIGNOCELLULOSE COMPOSITION BOARD INCLUDING EXHAUSTIVELY HYDRATED CELLULOSIC GEL BINDER

This application is a continuation-in-part of the patent application of James R. Roberts Ser. No. 597,450, filed July 21, 1975 for MEDIUM DENSITY, HIGH STRENGTH LIGNOCELLULOSIC COMPOSITION BOARD INCLUDING EXHAUSTIVELY HYDRATED CELLULOSIC GEL BINDER now abandoned.

BACKGROUND AND BRIEF DESCRIPTION OF THE INVENTION

This invention relates to lignocellulose composition boards. It pertains particularly to wood composition boards of high strength and medium density, e.g. a density of 20 to 50 pounds per cubic foot.

In the building trades need exists for a composition board, specifically a wood fiber board, of medium density and increased strength which retains the other necessary and desirable fiber-board properties of dimensional stability, thickness swelling, water absorption, uniformity, and the like. If such a fiber board product were to be available commercially, it could be substituted in building materials specifications for fiber boards of substantially higher density. This would result in significant savings of raw materials, as well as in important economies in building material costs and transportation costs.

Accordingly, it is the general purpose of the present invention to provide a composition board product of medium density and greatly increased strength which is characterized also by acceptable properties of dimensional stability, thickness swelling, water resistance, and uniformity.

It is a further purpose of the present invention to provide a composition board product of low cost which can be produced in high yield from its original starting materials.

A further object of the present invention is the provision of a composition board product which does not require the inclusion together with its primary fibrous lignocellulose component of an excessively large quantity of an exotic binder of high cost.

Still another object of the present invention is the provision of a composition board product including a low cost binder which serves the ancillary functions of acting as a dispersant for the lignocellulose fiber component of the board, as a fines retention agent, and also as a board density control agent.

A still further object of the present invention is the provision of a rapid and economical process for the manufacture of composition boards having the above noted qualities of medium density and high strength.

I now have discovered that the foregoing and other objects of the present invention are achieved by the provision of a medium density composition board comprising broadly, on a dry weight basis, from 60 to 95% by weight of lignocellulose fiber and from 5 to 40% by weight of a unique cellulosic gel binder. As will be described in detail hereinafter, the cellulosic gel binder employed is exhaustively hydrated so that it is characterized in its gel condition by a TAPPI drain time of at least 350 seconds, preferably at least 900 seconds, and specifically from 900 to 2000 seconds.

The medium density board product of the invention has a density of from 20 to 50 pounds per cubic foot. However, it has strength properties which are characteristic of prior art fiber boards having a much higher density. For example, a medium density fiber board of the invention at a density of 30 pounds per cubic foot meets the current product standards of the American Hardboard Association for building siding and furniture cores for wood fiber boards having a density of 42 pounds per cubic foot. The standards met include modulus of rupture, tensile strength, thickness swelling and water absorption. The savings in raw material use, transportation costs, and product cost resulting from the substitution of the hereindescribed medium weight product in building specifications are immediately apparent.

The noted improvement in strength is achieved, furthermore, at no sacrifice of the other important properties required of fiber board products.

This desirable result is achieved as a direct consequence of the inclusion in the hereindescribed fiber board products of an exhaustively hydrated cellulosic gel binder as a major component of the board-making furnish. In the forming of the board product, the gel component not only acts as an efficient binder in a quick pressing operation to bind the particles of lignocellulose into an integral board, it also acts as a dispersant for the fibers so that a uniform board free from the presence of bunched fiber aggregates is obtained. It also shrinks during drying of the board with the result that it compacts and integrates the other board components. Being water resistant per se, it augments the water resistant characteristics of the finished board product.

DESCRIPTION OF SPECIFIC EMBODIMENTS

The medium density, high strength, lignocellulose composition boards of my invention are illustrated by the following general and preferred formulations, wherein percent is given in percent by weight, on a dry weight basis:

|  | General Composition (%) | Preferred Composition (%) |
| --- | --- | --- |
| Lignocellulose Particles | 60 to 95 | 70 to 90 |
| Hydrated cellulosic gel binder | 5 to 40 | 10 to 30 |

The lignocellulose which is the primary structural component of the hereindescribed medium density composition boards may be derived from a wide variety of sources. Representative sources include bagasse and such woods as the wood of the eucalyptus, cottonwood, willow, alder, Douglas fir and pine.

Where woody materials are employed they may be used in the form of chips, planer shavings, flakes or sawdust. Whatever their source, the materials first are size reduced, preferably by being defibrated to the form of lignocellulosic fibers and fiber bundles. This is accomplished in suitable apparatus, such as Bauer or Sprout-Waldron mechanical refiners. A preferred defibrating system includes the conventional Asplund defibrator wherein wood pieces are subjected to abrasive reduction in an environment of steam under pressure of from 40 to 150 pounds per square inch. If desirable or necessary, the fibrous product of the Asplund machine may be passed to a secondary refiner such as an Asplund raffinator for ultimate reduction to a particle size of 10% maximum plus 12 mesh, U.S. Sieve Series.

The second primary constituent of the hereindescribed medium density high strength lignocellulose composition boards is an exhaustively hydrated cellulosic gel binder used in an amount of from 5 to 40%, preferably 10 to 30% by weight, dry board basis.

This material distinguishes from the hydrated cellulosic gels of the prior art in that it is exhaustively hydrated to a condition in which it has substantially no fiber structure at all. The difference becomes evident when the gels are subjected to the conventional Schopper-Riegler freeness test, or TAPPI Standard T221-OS-63.

In accordance with TAPPI Standard T221-OS-63, used to measure the freeness of various slow pulps such as are under consideration here, a pulp sample is formed into a sheet 6¼" in diameter in a Williams sheet mold. The sheet formed in the mold contains 1.2 grams of dry pulp or gel. The drainage time required to form the sheet is measured and becomes an indication of the degree of hydration of the stock.

In using this test, it readily is possible to distinguish the hereindescribed highly hydrated cellulosic gel binders from the hydrated cellulosic gel products of the prior art, such as those employed in the manufacture of glassines paper, and those employed in the manufacture of prior art composition board products such as are disclosed in Roberts U.S. Pat. No. 3,379,608-9. Both of these made use of hydrated cellulosic gels having a drain time, as measured by the above mentioned TAPPI standard T221-OS-63 of about 300 seconds.

I have discovered, however, that it is possible to hydrate cellulosic gel to a degree much more highly advanced than that characteristic of the gels employed in either glassines paper or the composition boards of the aforesaid patents. Thus, whereas the named prior art gels have a TAPPI standard freeness measured by a drain time of about 300 seconds, the gels employed in my invention have drain times of at least 350 seconds, preferably above 900 seconds, and in particular from 900-2000 seconds.

Other test methods may be employed to identify and characterize the hereindescribed exhaustively hydrated cellulosic gel binders.

One such is to determine the shrinkage upon drying of the hand sheet produced by the above described TAPPI T221-OS-63 test. A suitably hydrated gel will form a hand sheet which shrinks upon drying to bone-dry condition to a diameter which is at least 20% smaller than its original diameter. In making this determination, a wet TAPPI handsheet measuring 6¼" in diameter is rolled up, oven dried to bone-dry condition, and the length of the dried roll measured. From the difference between these two measurements the percent of shrinkage is calculated.

In a second method, the handsheet is dried and a small flame applied to its underside. If the cellulose is sufficiently hydrated, the flame instantaneously will produce a blister on the sheet.

In a fourth test method, 250 ml. of the refined pulp slurry is dried into a solid ball. If the gel is sufficiently hydrated for the present purposes, the ball will sink when dropped into water and thereafter will remain hard without swelling for an indefinite period of submergence.

The use of the thus characterized exhaustively hydrated cellulosic gel binders in the medium density composition boards of my invention is critically significant for several reasons.

In the first place, the gel serves as a highly efficient binder which binds the lignocellulose fibers together in an integrated product. Upon drying, the gel binder shrinks materially, pulling the particles together and locking them irreversibly in their consolidated condition. This factor is of primary importance in determining the increased strength of the board product.

The gel also serves as a binder, which acts very rapidly to set the thickness and density of the felted sheet when it is introduced into the press. This makes possible a quick pressing operation, i.e. one requiring a press time of only 10 seconds to three minutes, preferably from 10 seconds to 60 seconds. This in turn produces significant economies in requiring only a relatively inexpensive single opening press, which easily is adaptable to inclusion in conventional plant production lines.

Several other important advantages stem from the use of the novel cellulosic gel binder described above. The binder imparts water resistance to the board product in which it is contained. As noted, such products contain from 5 to 40% by weight of the binder and the binder is so highly hydrated as to be substantially insoluble in water. This imparts a high degree of binder water resistance to the board product. The gel binder is superior in this respect to conventional fiber board binders such as the urea formaldehyde thermosetting resins.

Still further, the gel is a highly efficient dispersion aid in the formulation of the fiber slurries from which the boards are made. In this application, it disperses into individual fibers wood fiber clumps which may be contained in the slurry. It also thickens the slurry so that as it is run on the wire at a consistency of about 5% there is little tendency for any light particles contained in the slurry to float, or any heavy particles to sink. Still further, it is responsible for the formation of a very stable slurry which is converted to a finished board product of completely homogeneous cross section.

Fourth, the gel serves as a fines retention agent. This is of particular importance during vacuum forming of the board from a pulp slurry run onto the screen. During this procedure, finely divided particles present in the slurry tend to be extracted from the formed sheet by the run-off water. As a retention aid, the gel serves the valuable function of retaining these fines within the sheet, thereby conserving raw materials, improving the properties of the board, and minimizing a waste disposal problem.

The hydrated cellulosic gels suitable for the intended purpose are products in which water of hydration is added to cellulose molecules by the substantially complete beating or refining of cellulose in aqueous medium. The cellulose thereby is converted from a fluffy, fibrous condition into a gelatinous condition, the degree of conversion being dependent upon such variables as the duration of the refining, the nature of the refining equipment, the presence or absence of extraneous chemicals, etc. Conventionally, the conversion is effectuated by mechanically treating cellulose pulp in aqueous medium in disc type refiners equipped with lava tackle or in conical refiners such as the Jordan.

The cellulose pulp for the gel manufacture may be derived from any one of several sources, such as the bleached or unbleached wood or bagasse pulps manufactured by the conventional sulphate or sulphite papermaking processes. If bagasse is employed as the ultimate raw material, it preferably is depithed before being pulped. The pulps are available on the large commercial scale in the form of dried pulp sheets.

In the manufacture of the hereindescribed gel products, the cellulose pulp is refined and hydrated exhaustively to a high degree at which fiber structure is almost completely destroyed. This is accomplished by breaking down the cellulose pulp sheets to their component individual fibers or fiber clumps, preferably by adding the dry sheets and water to a conventional hydrapulper, and hydrapulping at a stock consistency of from 1 to 10%, preferably from 6 to 8%. This requires about 30 minutes.

The resulting pulp then is pumped to a storage tank and fed in controlled flow to the selected disc type or conical type primary refiner. There preferably are three such refiners arranged in series with a flow-restricting valve downstream from the last refiner to insure an adequate pressurized refiner dwell time. These abrade the pulp and hydrate it to a high degree by forcing water into the cellulosic structure.

The resulting partially refined and hydrated pulp is passed into a second storage tank which supplies a secondary refiner of the same general class as the primary refiner, but which is effective to complete the hydration and size reduction of the pulp to values imparting to the pulp TAPPI standard drain times of at least 350 seconds, preferably above 900 seconds. This is accomplished by a shearing action which almost completely destroys the fiber structure of the pulp and hydrates it exhaustively. This supplemental and exhaustive refining greatly improves the qualities of the pulp as a binder, dispersing agent, and retention agent when used in the manufacture of the hereindescribed medium density composition boards of high strength.

In particular, it makes of the gel an "irreversible" binder. This means that a composition board made with the hereindescribed highly refined gel binder can be subjected to the action of boiling water for several hours, with little softening or relaxing of the adhesive bond present between the bonded fibers. If the board is dried after having been subjected to such a boil test, it is just as strong as it was before boiling. This is the same characteristic exhibited by phenolic resins when they are used as binders. It no doubt is responsible for the improved water resistance of the composition boards of my invention.

In addition to the lignocellulose fiber and hydrated cellulosic gel binder which are the principal constituents of the hereindescribed composition boards, there may be included in the boards varying amounts of supplemental materials such as sizing material used in the amount required to develop desired properties in the board product. In particular, there may be incorporated in the boards from 0.5 to 3% by weight of conventional wax sizes such as Petrolatum or Hercules Paracol wax, in order to improve the water resistance of the boards.

Other additives which may be added are fire retardants such as borax, boric acid and ammonium phosphate; supplemental fibers such as sisal or fiberglass used in an amount of from 5 to 15% to increase toughness and impact resistance; pigments; and supplemental binders such as starch and phenolic resin binders, used in amount appropriate to the development of desired properties.

In the manufacture of the high strength, medium density composition boards of my invention, there are compounded together flows of three separate furnish components: Lignocellulose fiber slurry, hydrated cellulosic gel, and wax emulsion and/or other additives.

The lignocellulose fiber slurry is prepared as indicated above. In a typical instance, pulp logs with or without preliminary debarking are reduced to chips in a conventional chipper. The chips are fed to an Asplund Defibrator followed by a conventional Asplund type Raffinator which reduces the chips to a fiber slurry having a particle size of 10% maximum plus 12, U.S. Sieve Series. The slurry has a consistency of about 40% through the Defibrator and about 30% through the Raffinator.

In a preferred manner of operation the hydrated cellulosic gel component is prepared by feeding Kraft pulp to a conventional hydrapulper in which it is disintegrated into a fibrous slurry having a consistency of from 1 to 10%, preferably from 6 to 8%.

The resulting slurry is fed to a battery of three or four conventional refiners such as Jones refiners or modified Jordan refiners with straight steel tackle, or preferably with lava linings. The charge passes from one of these refiners to another and ultimately to a disc type refiner such as a Jones duo-flow disc refiner.

The flow through the sequence of refiners is throttled down by appropriate valving to give a pressurized dwell or residence time sufficient to develop a hydrated cellulosic gel product having a drain time by the above described TAPPI drainage test T221-OS-63 of at least 350 seconds, preferably at least 900 seconds, and specifically from 900 to 2000 seconds. This result is achieved by controlling the operating conditions in the refiner in such a manner as to beat and abrade the pulp for a total refining period of from 1 to 10 minutes at a pressure of from 20 to 120 psi using an energy input of from 25 to 50 horespower days per ton (HPD/T) of pulp.

The additive emulsion is prepared by emulsifying in water a conventional industrial wax such as Hercules Paracol or petrolatum, and mixing in predetermined amounts of any other selected additives.

The three foregoing constituents, i.e. the lignocellulose fiber slurry, the cellulosic gel slurry, and the additive emulsion, are fed together in metered flows into a mixing tank where they are intimately mixed together in the desired proportions.

The mix tank charge then is transferred to the chest of a forming machine which preferably is of the Fourdrinier type providing a high degree of suction for dewatering the stock. In the forming machine, the charge is run into a wet sheet having a pressed thickness of about one and one-half inches, pressed, in a rotary press section, and cut to length. Thereafter the resulting sheet is quick pressed to a thickness of from ¼ inch up to one inch on wire in a heated flat press, depending on the desired ultimate board thickness.

It is a particular feature of the invention that use of the hereindescribed novel cellulosic gel binder makes possible carrying out the press operation in a relatively inexpensive single opening press. This is for the reason that the gel acts to set the thickness and density of the sheet in the press during a very short press time of from 10 seconds to 3 minutes, preferably from 10 seconds to 60 seconds, at a pressure of 50 to 150 psi and a platen surface temperature of from 150° to 300° F. Exemplary conditions for pressing are 30 seconds at 100 psi and 240° F.

Other advantages flow from the application of the quick pressing procedure.

Quick pressing dries out the water to a tipple moisture content of about 35% by weight, vs. a conventional level of 55% so that less kiln time is required. This is accomplished without altering the properties of the gel binder.

Quick pressing also preheats the sheet so that less drying time is required subsequently in the kiln. Also, it forms a smooth top surface on the sheet which remains when the sheet is dried into a board.

Still further, the quick pressing operation permits control of the density of the finished board to within the desired 20 to 50 pounds per cubic foot range. Using the gel binder, it may be carried out without splitting of the sheet when the sheet is released from the press. This result clearly is attributable to the effective adhesive qualities of the gel binder.

It is followed by a kiln drying operation effectuated in three zones at successive zone temperatures of from 500° to 600° F., 400° to 500° F., and 300° to 400° F., with the higher temperatures at the head end of the kiln. Drying is continued to a final board moisture content of less than 2%, preferably about ½% by weight. Drying removes not only the free water from the board, but also most of the water of hydration from the cellulosic gel.

The resulting boards are cooled, trimmed, finished as needed for the contemplated product, and packaged, ready for shipping.

The presently described medium density, high-strength composition boards and their method of manufacture are illustrated in the following examples:

EXAMPLE 1

Eucalyptus wood chips were defiberized in an Asplund Defibrator operated at 150 psi, followed by refining in an Asplund type Raffinator to a fiber product size of less than 10% plus 12 mesh U.S. Sieve Series. The fibers were mixed with sufficient water to form a fiber stock having a consistency of 4%.

An exhaustively hydrated cellulosic gel was produced by hydrapulping unbleached kraft pulp to a consistency of 8%. The resulting pulp was passed through a series of three Jones Fiber-master No. II conical refiners followed by a Jones Duo Flow shearing type disc refiner. In their operation, the refiners were controlled by valving their discharge ports to achieve residence times within the refiners adequate to produce three types of gel, one having a drain time of 355 seconds, another of 1200 seconds and another of 1800 seconds, all as measured by TAPPI test standard T221-OS-63.

The foregoing constituents were mixed in a mix tank with 1% Hercules Paracol wax.

The three components of the furnish were mixed to uniformity, transferred to the chest of a Fourdrinier type forming machine and run into board. The board was pressed to thickness, dried, and tested for modulus of rupture.

Three sets of boards were thus manufactured and tested, using the gels having drain times of 355, 1200 and 1800 seconds, respectively. In each set of tests, three boards were prepared having gel contents of 10, 15 and 20% by weight respectively, dry board basis.

When pressing the first two groups of boards, the press pressure was 150 psi, the press temperature was 240° F., and the press duration 40 seconds. In the third group of boards, a press pressure of 100 psi, a press temperature of 240° F., and a press duration of 25 seconds were employed.

The results are given in the table below:

| Ex. No. | Board Thickness (inches) | Board Density lbs/cu/ft | Gel Drain Time (sec) | Gel Usage (%) | Stock Drain Time (Sec) | Modulus of Rupture (psi) |
|---|---|---|---|---|---|---|
| 1 | .517 | 24.7 | 355 | 10 | 10 | 870 |
| 2 | .509 | 27.2 | 355 | 15 | 14 | 1085 |
| 3 | .496 | 29.6 | 355 | 20 | 30 | 1470 |
| 4 | .525 | 31.8 | 1200 | 10 | 20 | 1150 |
| 5 | .528 | 30.0 | 1200 | 15 | 55 | 1900 |
| 6 | .500 | 32.6 | 1200 | 20 | 123 | 2500 |
| 7 | .505 | 30.1 | 1800 | 10 | 63 | 1620 |
| 8 | .510 | 29.8 | 1800 | 15 | 97 | 2550 |
| 9 | .495 | 30.0 | 1800 | 20 | 220 | 3060 |

It is apparent from the foregoing that the inclusion of the exhaustively hydrated cellulosic gel binder in the stipulated proportions exerts a profound and most remarkably beneficial effect on the strength properties of the composition boards of my invention. Thus, as shown in Example 9, including 20% of a gel having a drain time of 1800 seconds results in the production of a board having a density of only 30 pounds per cubic foot, but a modulus of rupture of over 3,000 pounds per square inch. This extraordinarily high modulus of rupture value is characteristic normally of boards not of the medium density 30 pounds per cubic foot class, but of boards of much higher density, i.e. boards having densities of the order of 45 pounds per cubic foot.

The resulting saving in raw material costs, transportation costs and board manufacturing costs are apparent. These are achieved, furthermore, while retaining the other properties of light weight, dimensional stability, uniformity, water resistance and workability which necessarily must characterize structural composition boards to render them suitable for their various uses.

EXAMPLE 2

Kraft cellulosic pulp was refined at a consistency of 4% in a "Bauer #442" refiner. This refiner was of the double disc plate type having one stationary and one rotating stainless steel disc. The spacing between the bars was about ¼".

Two series of runs were made, one without pressurizing the refiner and the other with the application of pressure to the pulp during refining.

In the first series, the outlet valve on the discharge side of the refiner was left wide open, with the result that the pressure in the refiner was only 5 psi. The TAPPI drain time of the processed pulp after two passes through the refiner was only 10 seconds. The drain time of the unprocessed pulp was 7 seconds.

In the second series, the valve on the discharge side of the refiner was throttled to develop a pressure of 65 psi in the refiner. The TAPPI drain time of the pulp after two passes through the refiner was 160 seconds; after three passes, 385 seconds; and after four passes, 590 seconds.

Total refining time for the four passes was about four minutes and total energy consumption was about 49 HPD/T. A handsheet made from the finished gel after the fourth pass blistered when a match was applied to its underside. A dried ball of the same gel sank when dropped into water.

Having thus described my invention in preferred embodiments, I claim:

1. A water laid, pressed and dried medium density lignocellulose composition board having a density of at least 20 pounds per cubic foot and high strength comprising on a dry weight basis:

|  | % by weight |
| --- | --- |
| Lignocellulose fibers | 60 to 95 |
| Hydrated cellulosic gel binder | 5 to 40 | the hydrated cellulosic gel binder being derived from cellulosic chemical pulp and being characterized in its gel condition (1) by a TAPPI drain time of at least 350 seconds and (2) by at least 20% shrinkage, upon being dried to a bone-dry condition, of a TAPPI hand sheet made from the binder.

2. The composition board of claim 1 wherein the lignocellulose fibers comprise defiberized wood.

3. The composition board of claim 1 wherein the lignocellulose fibers comprise defiberized bagasse.

4. The composition board of claim 1 wherein the lignocellulose fibers have a particle size determining a TAPPI-CSF freeness of the fiber of less than 750.

5. The composition board of claim 1 wherein the lignocellulose fibers are employed in an amount of from 70 to 90% by weight and the hydrated cellulosic gel binder is employed in an amount of from 10 to 30% by weight.

6. The composition board of claim 1 wherein the hydrated cellulosic gel binder is characterized by a TAPPI drain time of at least 900 seconds.

7. The composition board of claim 1 wherein the hydrated cellulosic gel binder is characterized by a TAPPI drain time of from 900 to 2000 seconds.

8. The composition board of claim 1 wherein the board has a density of from 20 to 50 pounds per cubic foot and a modulus of rupture of at least 2000 pounds per square inch.

9. A water laid and pressed and dried lignocellulose composition board having a density of from 20 to 50 pounds per cubic foot and a modulus of rupture of at least 2000 pounds per square inch and comprising, on a dry weight basis:

|  | % by weight |
| --- | --- |
| Lignocellulose fiber | 70 to 90 |
| Hydrated cellulosic gel binder | 10 to 30 | the lignocellulose fiber having a TAPPI-CSF freeness of less than 750 and the hydrated cellulosic binder having a TAPPI drain time of at least 900 seconds.

10. The process of making medium density high strength composition board which comprises:

(a) abrading and beating cellulose chemical pulp in aqueous medium to the condition of a hydrated cellulosic gel binder having a TAPPI drain time of at least 350 seconds and characterized by at least 20% shrinkage of a hand sheet made from the binder upon being dried to a bone-dry condition, (b) the abrading and beating of the cellulose pulp being carried on for a period of from 1 to 10 minutes under a pressure of from 20 to 120 psi with an energy input of from 25 to 50 HPD/T, (c) forming an aqueous slurry comprising

|  | % by weight dry weight basis |
| --- | --- |
| Lignocellulose fibers | 60 to 95 |
| Hydrated cellulosic gel binder | 5 to 40 | and water in amount predetermined to impart a board-forming consistency to the slurry, (d) felting the slurry into a wet sheet on a board-forming screen, and (e) drying the sheet.

11. The process of claim 10 wherein the lignocellulosic fibers comprise wood fiber having a TAPPI-CSF freeness of less than 750.

12. The process of claim 10 wherein the gel has a TAPPI drain time of at least 900 seconds.

13. The process of claim 10 wherein the gel has a TAPPI drain time of at least 900-2000 seconds.

14. The process of claim 10 including the step of pressing and drying the wet sheet to a broad product having a density of from 20 to 50 pounds per cubic foot.

15. The process of claim 10 including the step of drying the slurry by quick pressing it at from 50 to 150 psi and 150 to 300° F. for from 10 seconds to three minutes, followed by kiln drying the resulting sheet unrestrained to a predetermined moisture content.

16. The process of making medium density composition board which comprises forming an aqueous slurry comprising:

|  | % by weight dry weight basis |
| --- | --- |
| Lignocellulose fibers | 60 to 95 |
| Hydrated cellulosic gel binder | 5 to 40 | and water used in amount sufficient to form an aqueous slurry of board-forming consistency.

(b) the hydrated cellulosic gel in its gel condition being derived from chemical cellulose pulp and being characterized by a TAPPI drain time of at least 350 seconds, and by at least 20% shrinkage of a hand sheet made from the gel upon being dried to a bone dry condition, (c) felting the slurry into a sheet on a board-forming screen, and (d) drying the sheet by quick-pressing it to a dry density of from 20 to 50 pounds per cubic foot, at 50 to 150 psi and 150 to 300° F. for a time of from 10 seconds to three minutes, and thereafter kiln drying the pressed sheet to the predetermined moisture content.

* * * * *